Nov. 18, 1924.
C. O. HEDSTROM
1,515,679
ANTISKID CHAIN FOR AUTOMOBILES
Filed March 9, 1923
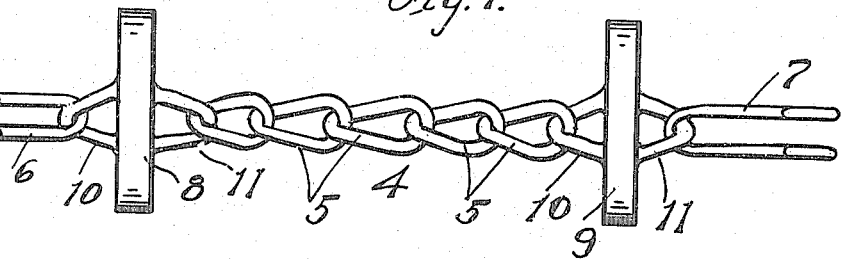
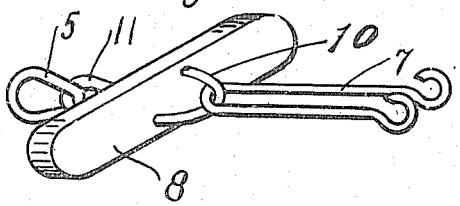
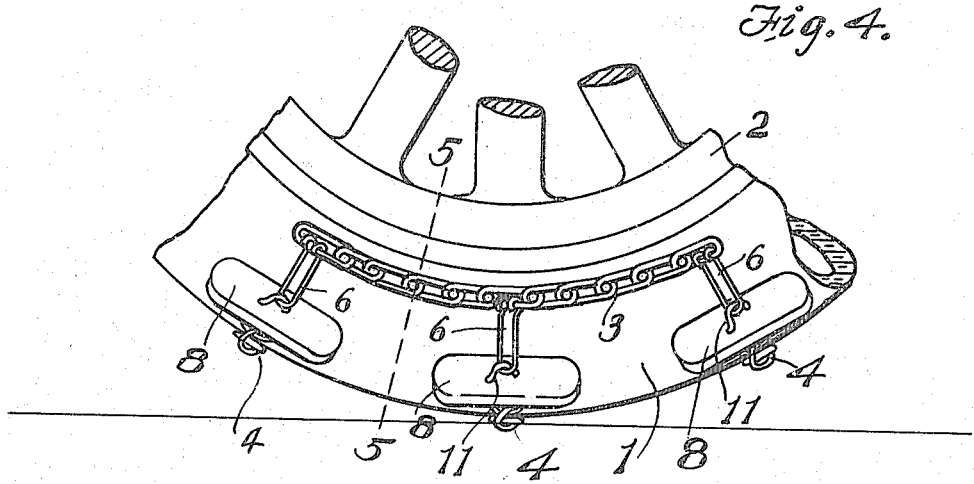
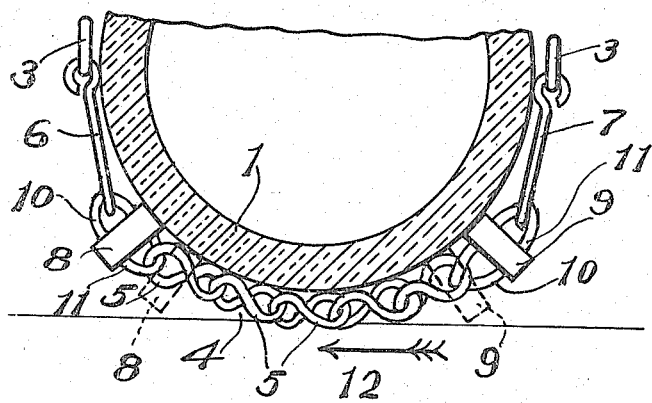
INVENTOR.
Carl O. Hedstrom.
BY
Harry W. Bowen.
ATTORNEY.

Patented Nov. 18, 1924.

1,515,679

UNITED STATES PATENT OFFICE.

CARL O. HEDSTROM, OF PORTLAND, CONNECTICUT.

ANTISKID CHAIN FOR AUTOMOBILES.

Application filed March 9, 1923. Serial No. 623,876.

*To all whom it may concern:*

Be it known that I, CARL O. HEDSTROM, a citizen of the United States of America, residing at Portland, county of Middlesex, State of Connecticut, have invented certain new and useful Improvements in Antiskid Chains for Automobiles, of which the following is a specification.

This invention relates to improvements in non-skid devices for motor vehicles and particularly to improvements in what is known as the cross chains which extend transversely of the plane of the wheel from one side portion of the tire to the other. These chains are for the purpose of producing a greater gripping effect between the tire and the roadbed. It has been found from practice that these cross chains do not effectually prevent the car from skidding or having a sidewise movement on slippery pavements as the sidewise direction of the tire during the skidding movements is longitudinal or in the same direction as the cross chains. Furthermore these cross chains only cover a portion of the tread of the wheel leaving a comparatively wide space or arc from one chain to the other, and when the skidding takes place it is usually on the part of the tire between these cross chains.

An object of the present invention, therefore, is to provide the cross chains with suitable attachments or made a part of these chains so that when the machine or wheels start to skid the attachment on the cross chain which is located between the cross chains will be brought into direct contact with the roadway and will supply suitable and additional gripping effect to prevent the wheel from skidding or sliding sidewise to any great extent.

The invention broadly comprises bar members which are located at or near the opposite ends of the cross chains, yet sufficiently close to the tread of the tire, but normally out of contact with the roadway when the machine commences to skid or move sidewise.

Further objects and nature of the invention will appear in the body of the specification and will be particularly pointed out in the claim.

Referring to the drawings:

Fig. 1 is a plan view of one of the cross chains showing the bars or attachments located near the ends of the chains and adjacent the terminal hooks.

Fig. 2 is a end view of the chain shown in Fig. 1 looking from the left and illustrating the hooks and the arrangement or connection of the integral eye with the bar.

Fig. 3 is a perspective view of a portion of the cross chain showing one of the bars, the integral eyes attached to the bar and one of the end hooks.

Fig. 4 is a side elevational view of a portion of a pneumatic tire a portion of one of the side chains and illustrating three of the cross chains with the cross bars or plates located adjacent the tread of the tire, and Fig. 5 is a partial sectional view on the line 5—5 of Fig. 4 showing one of the cross chains and an end view of the bars in the cross chains.

Referring to the drawings in detail:

1 designates a portion of a pneumatic tire that is located on the rim or felloe 2 of the usual wheel construction. 3 is the side chain which extends around the pneumatic tire and adjacent the base of the same. 4 designates as a whole the cross chain having the series of links 5, the usual end hooks 6 and 7 which are attached to the side chains 3. Located near the ends of the cross chains are two bars or plates 8 and 9 and these bars are formed with the integral link or eye portions 10 and 11. The bars 8 and 9 are attached to or made a part of the eye portions 10 and 11.

In operation the attachment or bars 8 and 9 may be described as follows:

Should the wheel have a tendency to skid or slide sidewise in the direction of the arrow indicated at 12 in Fig. 5 the weight of the car on the tire 1 would have a tendency to slide or move along the cross chain 4 but the cross chain being in contact with the ground or roadway, would be more or less fixed or with the result that the bar 8 would be brought into contact with the roadway and the angular or sharp corner edge of the bar would serve as a means to prevent further transverse movements or skidding of the wheel, that is to say the cross chain would be tightened on the tire and rigidly hold the bar 8 against the roadway. Since these bars are of considerable length they would afford greater gripping surface. Should the machine skid in the opposite direction from the arrow 12 the oppositely located plate 9 would operate in the same manner. Normally the bars 8 and 9 are out of contact with the roadway and are only brought into use when the wheel or machine moves transversely to its line of direction. An important feature of my present improvement is that the single cross-chain, as a whole, may be reversed, that is to say, when the intermediate links 5 become partially worn the chain, as a whole, may be disconnected at its ends from the side chains 3 and turned over or reversed so that the other side of the links 5 that are not worn may be used. The other edges of bars 8 and 9 may also be brought into contact with the roadway and sides of the tire. This is permissible since the bars are formed alike on their opposite edges and will fit against the tire just as well when used with either side towards the roadway. The bars 8 and 9 are so constructed that they will operate equally as well when either side edge is presented to the roadway or rests against the side of the tire. By employing the single links 6 and 7 the cross chain cannot twist but will lie flat against the tire at all times.

It will be seen from this description that I have provided an attachment for a cross chain comprising an integral part thereof for supplying a greater gripping surface between the cross chains, and one that will normally be inoperative but will come into use when the machine skids or moves sidewise. The length of these plates on the cross chains may be of any suitable dimensions as desired.

It should be observed that the hooks or eyes 10 and 11 shown in Fig. 3 are twisted or given a partial turn similar to the links 4 and the end hooks 6 and 7 are formed without a twist or partial turn. The bars 8 and 9 when in use should lie smoothly in contact with the sides of the tire throughout their length.

What I claim is:

A cross chain having a series of intermediate links, bars located adjacent the ends of the said links and formed with integral eyes, which are located on the opposite sides of the bars, said eyes being respectively for the purpose of receiving the end hooks of the chain which are connected to the side chains and for connection with the series of links, the construction and arrangement being such that the chain may be reversed to present the inner surface to the roadway.

CARL O. HEDSTROM.